Figure 1:
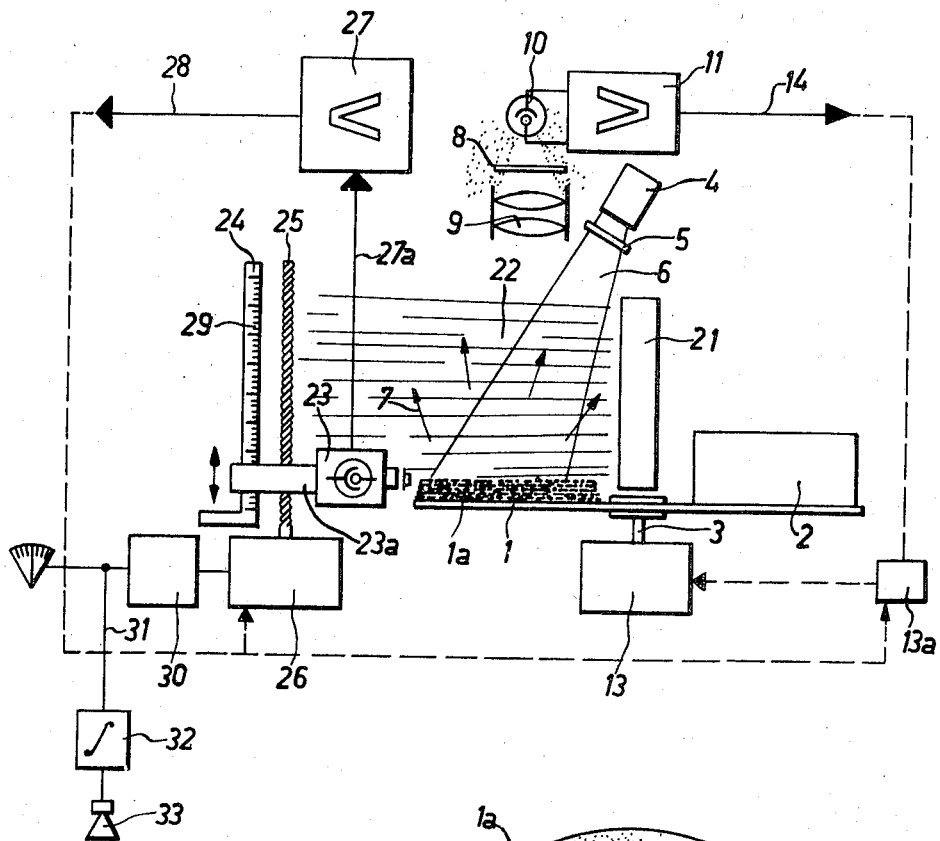

United States Patent

Sturzinger

[15] 3,647,301
[45] Mar. 7, 1972

[54] SYSTEM FOR ASCERTAINING THE ACCUMULATION OF PULVERULENT, GRANULAR OR FLAKY BULK GOODS

[72] Inventor: Oskar Edwin Sturzinger, Kirchmattweg 6, Baar, Zug, Switzerland

[22] Filed: Jan. 9, 1970

[21] Appl. No.: 1,636

Related U.S. Application Data

[63] Continuation-in-part of Ser. No. 695,995, Jan. 5, 1968.

[30] Foreign Application Priority Data

Jan. 15, 1969 Switzerland ..............................733/69

[52] U.S. Cl..............................356/103, 250/219, 250/222, 356/210, 356/244
[51] Int. Cl................G01n 21/00, G01n 21/48, G01n 21/16
[58] Field of Search..................................356/102–104, 38, 356/156, 210–212, 244; 250/219 TH, 222

[56] References Cited

UNITED STATES PATENTS

| | | |
|---|---|---|
| 1,706,857 | 3/1929 | Mathe..................................356/156 X |
| 2,076,553 | 4/1937 | Drinker et al............................356/38 |
| 2,076,554 | 4/1937 | Drinker et al............................356/38 |
| 2,489,286 | 11/1949 | Grant, Jr...................................356/38 |
| 2,604,809 | 7/1952 | Mitchell..............................250/222 X |
| 3,065,665 | 11/1962 | Akhtar et al........................356/103 X |
| 3,232,711 | 2/1966 | Senyk et al............................356/38 X |
| 3,258,686 | 6/1966 | Selgin ..............................356/156 X |
| 3,330,961 | 7/1967 | Juengst et al....................250/219 TH |
| 3,518,441 | 6/1970 | Selgin..............................250/219 TH |
| 3,526,461 | 9/1970 | Lindahl et al............................356/38 |

Primary Examiner—Ronald L. Wibert
Assistant Examiner—Warren A. Sklar
Attorney—Fitch, Even, Tabin & Luedeka

[57] ABSTRACT

A system is provided for determining an accumulation per unit time and for determining a layer thickness of accumulation of bulk goods such as pulverulent, granular or flaky goods. Preferably, the system uses diffused reflected light from the bulk goods being deposited on a moving surface to determine the rate of accumulation and an optical system including a further light beam and photocell to measure the layer thickness of the accumulation. An integrating means may be provided for ascertaining a cumulative total accumulation within a predetermined period of time.

10 Claims, 2 Drawing Figures

SYSTEM FOR ASCERTAINING THE ACCUMULATION OF PULVERULENT, GRANULAR OR FLAKY BULK GOODS

This application is a continuation-in-part application of copending application Ser. No. 695,995 filed Jan. 5, 1968 and entitled "Detector Means for Pulverulent, Granular or Flaky Material."

The present invention relates to a system for determining the accumulation of bulk goods per unit of time on a depositing surface and also the thickness of the layer being accumulated on the surface.

In the above-identified application, the rate of accumulation of a pulverulent, granular or flaky bulk goods is determined by system having a light emitter directing a light beam onto the bulk goods being deposited on an optically contrasting surface. Diffused light reflected from the bulk goods is directed to a photocell which produces a signal practically proportional to the accumulation of goods per unit of time. In the illustrated embodiment of the invention, the depositing surface is continuously rotated by a shaft and, in the course of it rotational movement, a stripper removes the bulk goods from the depositing surface at one position and the light beam strikes the bulk goods on the depositing surface at another angularly spaced position. Thus, the rate of accumulation is measured.

The present invention relates to not only determining the accumulation of bulk goods per unit but also to determining the thickness of layer of goods accumulated. If the rate of accumulation and the layer thickness are known for a material having a known specific gravity, then the specific bulk weight or specific bulk density may be easily computed.

The measuring of the layer thickness as well as the rate of accumulation is of particular importance where the accumulating material may be deposited in different forms or structures on the depositing surface. For example, snow may be accumulated in different forms as pellet-shaped snow, i.e., grains which fall at a relatively high temperature and result in a thinner layer for a predetermined value of the light diffusely reflected onto the photocell than will snow falling in flakes or shreds. Thus, the present invention provides a measurement of both layer thickness and rate of accumulation thereby permitting a determination of total thickness for a predetermined period of time or a determination of bulk weights for these respectively different kinds of snow.

Accordingly, a general object of the invention is to provide a system of the foregoing kind.

Figure 2:
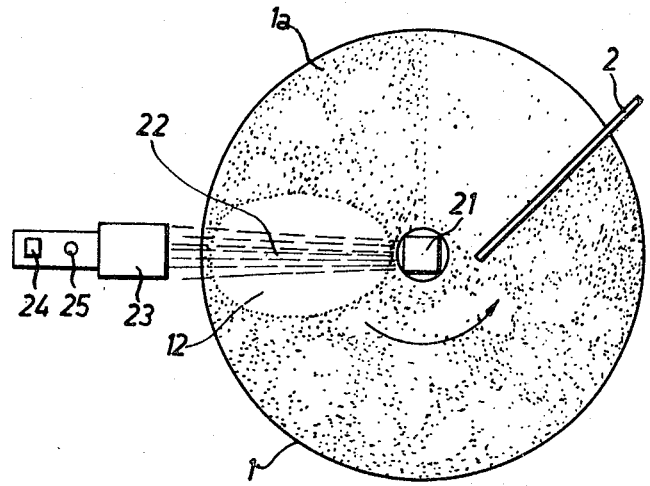

FIG. 1 a schematic lateral elevation of an arrangement according to the invention, and FIG. 2 a diagrammatic top plan view of the arrangement according to FIG. 1, some parts being omitted.

As shown in the drawings for purposes of illustration, the invention is embodied in a system in which a depositing plate 1 having a depositing surface is exposed to receive an accumulation of bulk goods which will form as a layer 1a on the depositing surface. The plate 1 is mounted on a rotatable shaft 3 which is rotated by a motor 13. During each revolution of the plate 1, a stripper means 2 continuously strips off the accumulated bulk goods from the depositing surface on the plate.

The depositing surface on the plate 1 is formed to be optically contrasting to the bulk goods. A light emitter or projector 4 emits a light beam 6 which passes through a filter 5 and which is inclined in a direction with respect to the plate 1 and the layer 1a to produce a light spot 12 on the plate. The light (indicated by arrows 7) diffusely reflected by the layer 1a or the light spot 12 is fed to the photocell 10 via a lens system 9 and a filter 8. The photocell 10 responds by delivering a signal having a magnitude which depends on the quantity of the diffusely reflected light received thereby. The output signal from the photocell 10 is fed into an amplifier 11 which is connected by an outlet line 14 to a speed control 13a which in turn, is connected to and controls the speed of the motor 13. Preferably, the speed of the motor 13 is adjusted to maintain the signal output of the photocell 10 at a constant value, i.e., the speed of turning is regulated so that the amount of the light reflected by the layer 1a remains approximately constant. If a greater amount of bulk goods accumulates per unit of time, then the speed of the motor will also be increased correspondingly. Conversely, if the rate of accumulation decreases, the motor speed is decreased.

In the illustrated arrangement, an additional light projector 21 is provided which produces a light beam which passes from the center of the plate 1 in a plane extending at right angles to the plate 1. This beam projects radially to a further photocell 23 which is outside of the circumference of the plate 1 and which is preceded by a suitable optical means or suitable diaphragms, so that only light extending parallel to the plate 1, will hit the photocell 23.

The photocell 23 is secured to a support arm 23a on a vertically extending gear spindle 25 which in turn can be driven by an adjusting motor 26 in both directions. The support arm 23a is guided for vertical movement by means of a guide rail 24 extending parallel to the gear spindle 25. The guide rail 24 preferably carries a scale 29 from which the momentary height position of the photocell 23 can be directly read.

The photocell 23 is connected by means of a connection line 27a to an amplifier 27 on the photocell and amplifier 27 produces an output signal proportional to the light quantity falling upon the photocell 23. The adjusting motor 26 is connected to and controlled by signals fed thereto over a line 28 from the amplifier 27. The adjusting motor 26 will start in one direction or the other depending on whether the signal on the line 28 is either above or below a predetermined threshold value. At the threshold value, the motor 26 will stop shifting the photocell 23. In this manner, the optical axis of the photocell 23 is adjusted to and maintained at about the height of the upper surface of the layer 1a. When the layer 1a becomes thicker, then less light will fall upon the photocell 23, the motor 26 will be started and the photocell 23 will be adjusted to a higher position until the threshold value has been reached again, i.e., until the position of the photocell 23 with respect to the plate 1 represents a measure for the thickness of the layer 1a.

For the purpose of providing a remote indication of the thickness of the layer 1a, means in the form of an adjusting emitter is suitably connected to the starting motor to provide over an outlet 31 an electrical or pneumatical signal representative of the layer thickness. A suitable gauge or other remote indicator may receive this signal over outlet 31; and moreover, the signal from the adjusting emitter 30 can be fed into an integrator 32 which, in a known manner, may calculate a cumulative total for thickness of the layers 1a of bulk goods for a certain period of time. This is of particular advantage when, for example, the system is used to ascertain the accumulation of snow inasmuch as, after a predetermined accumulation, the integrator 32 may switch in and operate a warning device 33 which in turn alarms snow removal services. These services, as is well known, are necessary only then when within a certain period of time such an amount of snow has fallen, which accumulated to a layer impeding the traffic.

The thickness of this layer, however, is dependent not only of the actual quantity of snow, but also of the period of time in which this snow quantity has fallen and in addition from the actual structure of the snow (wet snow, dry snow, snow having big or small flakes).

It will be appreciated that the present invention may be used in other fields, where bulk materials other than snow, be it a product or a waste product, occur and where it is desired to ascertain by technique of measurement of the thickness of the layer accumulating per unit of time.

What is claimed is:

1. A system for ascertaining the accumulation of pulverulent, granular or flaky bulk material comprising: a continuously moving contrasting background surface, a light projector for emitting a beam of light for illumination of said accumulating material and said surface when it is not covered by said accumulation, said light being reflected from said accumulating material as diffused light, means including a photocell positioned to receive said diffused light representative of the accumulation and to provide an output representative of accumulation per unit time, stripper means for removing said accumulation from said surface after a predetermined period of time, means for measuring the thickness of the layer of accumulating material on said background surface comprising a light source to project light across said surface and a further photocell to receive light from said light source, and means to utilize the output of said further photocell as an indication of the thickness of the layer of accumulating material.

2. A system in accordance with claim 1 including an integrator means connected to said further photocell to calculate a cumulative total and to provide an output signal after a predetermined cumulative total layer thickness is achieved.

3. A system in accordance with claim 1 in which said light source extends in a plane at substantially right angles to the background surface and directs a light beam having rays which are directed parallel to said background surface in a plane substantially perpendicular to said background surface.

4. A system in accordance with claim 3 further comprising means for shifting said further photocell to positions in accordance with the thickness of the layer on the background surface.

5. A system in accordance with claim 4 in which said further photocell has an optical axis, said means for shifting said further photocell comprises a motor means for shifting said further photocell in a direction perpendicular to the plane of said background surface and in which an electrical control means for said motor means is controlled by said further photocell to stop said shifting when the optical axis of said further photocell is adjusted to about the outer surface of said layer of accumulating material.

6. A system in accordance with claim 4 further comprising means to continuously move said background surface past said light projector and said light source.

7. A system for ascertaining the accumulation of pulverulent, granular or flaky bulk goods, optically in contrast to a background, comprising a depositing surface rotatable about a predetermined axis to receive an accumulation of bulk goods thereon, a light emitter for directing a light beam towards the bulk goods on said surface, a first photocell for receiving light diffusely reflected from the bulk goods, stripper means for removing deposited bulk goods from said depositing surface in the course of a revolution thereof, means to utilize the output of the first photocell as an indicator of the properties of the accumulative material on the surface, an additional light emitter for providing a flat light beam in a plane extending at right angles to said depositing surface, a further photocell movable at right angles to said depositing surface for receiving said light from said additional light emitter and control means operable in response to output signals from said further photocell to move the latter to positions in accordance with the thickness of the bulk goods prevailing on said depositing surface.

8. A system according to claim 7 further comprising remote indicating means connected to said further photocell for indicating the thickness of said layer at a location remote from said background surface.

9. A system according to claim 7, further comprising an integrator means connected to said further photocell to provide an output signal for a predetermined total accumulation when achieved within a given period of time.

10. A system according to claim 7, further comprising means for rotating the background surface and means for regulating the speed of rotation according to the output of one of said photocell and said further photocell.

* * * * *